E. DUBIED.
VALVE FOR PNEUMATIC TIRES.
APPLICATION FILED SEPT. 19, 1908.
929,571.
Patented July 27, 1909.
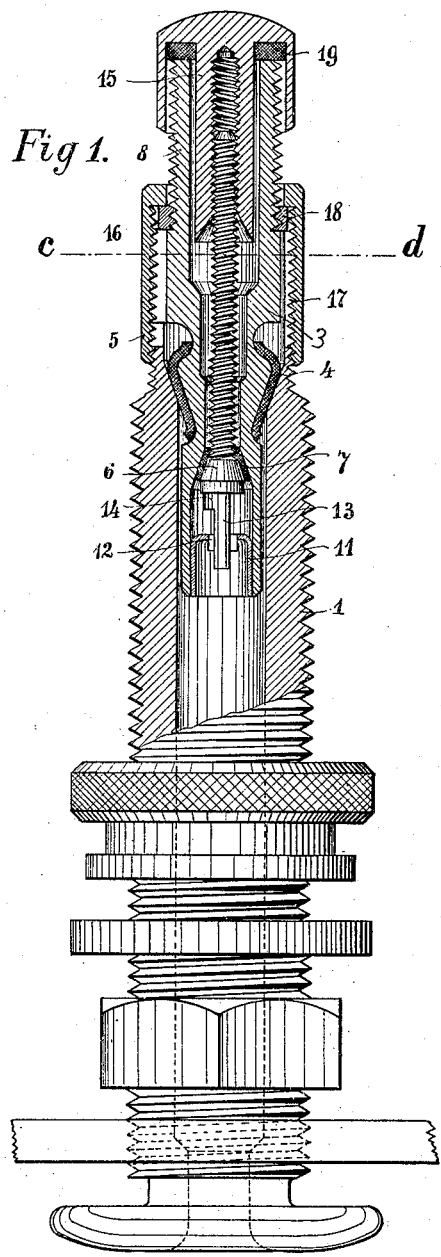
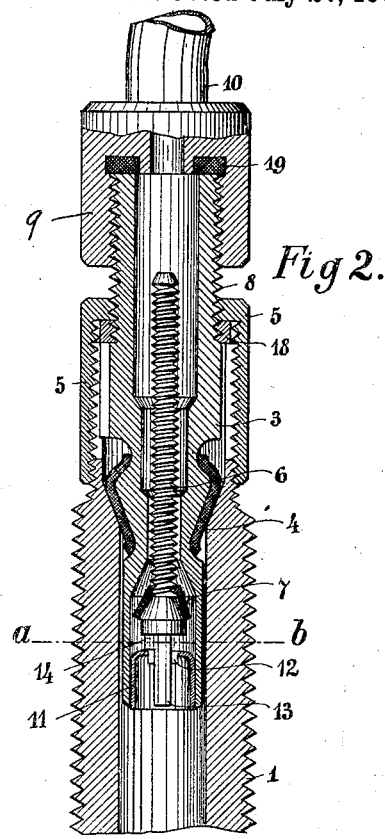
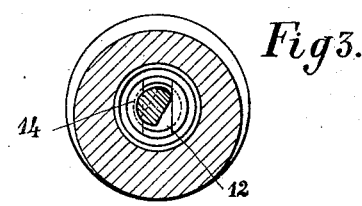
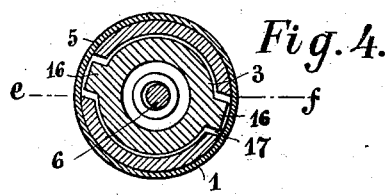
WITNESSES:
Edw. Spring.
W. P. Burke
INVENTOR,
Edouard Dubied,
BY
ATTY.

UNITED STATES PATENT OFFICE.

EDOUARD DUBIED, OF COUVET, SWITZERLAND, ASSIGNOR TO EDOUARD DUBIED & CIE., OF COUVET, SWITZERLAND.

VALVE FOR PNEUMATIC TIRES.

No. 929,571.   Specification of Letters Patent.   Patented July 27, 1909.

Application filed September 19, 1908. Serial No. 453,880.

*To all whom it may concern:*

Be it known that I, EDOUARD DUBIED, a citizen of the Republic of Switzerland, residing at Couvet, in the Canton of Neuchâ- tel, Republic of Switzerland, whose post-office address is Couvet, have invented certain new and useful Improvements in Valves for Pneumatic Tires; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates to valves for pneumatic tires, and has for its object to design a valve, simple in construction and with a body-portion of comparatively small diameter without, however, the flap or other parts being made excessively small, and without the passage of the air being too greatly impeded during the inflation of the pneumatic tire.

In the accompanying drawings, Figure 1 is a partial section on the line *e—f* in Fig. 4 and showing the valve closed, while Fig. 2 shows the position of the valve during the inflation of a tire. Fig. 3 is a section on the line *a—b* in Fig. 2 and Fig. 4 a section on the line *c—d* in Fig. 1.

1 is the outer valve-body, furnished with a headpiece 2 arranged on the lower end.
This headpiece is introduced into the pneumatic tire. Nuts on the valve-body serve to screw the same tightly upon the pneumatic tire and on to the rim or felly. The valve-body is bored axially throughout its length, and is provided at its upper end with a funnel-shaped enlargement which serves as a seat for the inner valve-body 3. This latter is furnished with an outside packing 4 and is forced against the seat of the outer valve-body by a nut 5. Vanes 16 lying diametrically opposite each other and arranged on the inner valve-body, enter corresponding slots 17 in the outer valve-body and prevent the inner valve-body rotating when the screw-nut 5 is tightened. A packing ring 18 placed between the valve-body 3 and the screw-nut 5 prevents dust entering between the outer and the inner valve-bodies. Thus the two valve-bodies 1 and 3 are packed in relation to one another in two places. In the interior of the valve-body 3 is the valve spindle for the valve-cone 6. This valve-spindle is screw-threaded over the greater portion of its length. The valve-cone 6 is also provided with a packing 7, and is pressed against the conical valve-seat situated in the lower part of the valve-body 3, by the pressure of the air in the tire and by the tension of a nut 15 in the manner hereinafter described.

The upper part of the valve-body 3 is formed with an external screw-thread 8 for receiving the union-nut 9 of a pipe 10 (Fig. 2) communicating with the air pump. While air is being pumped into the pneumatic tire, the valve-cone 6 moves downward at each stroke of the piston. In order to prevent the valve-cone falling out, a slightly conical sleeve 11, provided with a slot 12 (Figs. 2 and 3) is inserted by means of powerful pressure into the lower end of the valve-body 3. The underside of the valve-cone is provided with a flattened portion 13 which enters the slot 12 in the sleeve 11 and prevents the valve-cone from rotating (see Fig. 3). The part 13 is of such a length that it cannot pass out of the slot 12 during the working of the valve. In order that the valve-body may be prevented from lying on the sleeve 11 during the passage of the air through the valve, and thus interrupt the flow of the air, a lateral projection 14 is provided on the part 13. During the inflation of the tire this projection lies on the bottom of the sleeve 11, while the slot 12 remains partially uncovered and permits the air to flow through to the tire (see Figs. 2 and 3). When the tire has been fully inflated, the union-nut 9 is removed and the nut 15 substituted, this nut pressing the valve-cone 6 against its seat, and preventing the air flowing back out of the tire. Further packing is also provided in the form of a ring or the like 19 and is inserted in the nut 15, so that in the event of air leaking past the valve 6 same cannot pass out of the valve-body.

What I claim is:—

A valve for pneumatic tires, comprising a valve-body, a valve therein, a spindle carrying the valve, a stationary cap shaped sleeve having a slot therein through which a portion of the valve spindle passes, said valve spindle having a cutaway portion thereon so as to permit the passage of air through the opening, and a projection adapted to engage with the sleeve for limiting the movement of the valve.

In testimony whereof, I have signed my name to this specification in the presence of two subscribing witnesses.

EDOUARD DUBIED.

Witnesses:
   EUGENE KREBY,
   CARL GOSSWEILER.